Figure 1:
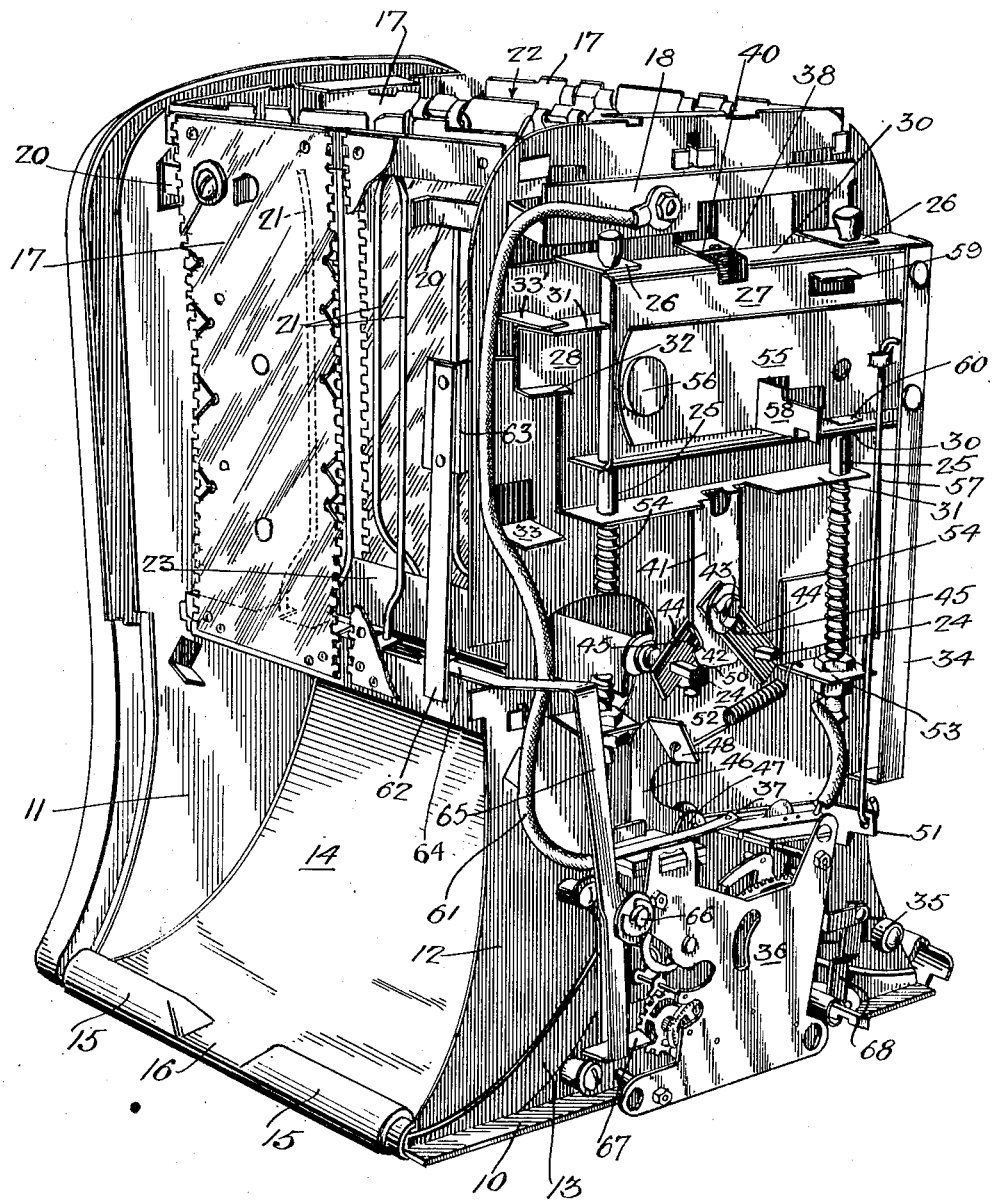

May 8, 1951 F. BERTINO 2,552,135
POP-DOWN TOASTER
Filed April 10, 1948 4 Sheets-Sheet 1

INVENTOR
Fred Bertino,
BY
ATTORNEYS

May 8, 1951  F. BERTINO  2,552,135
POP-DOWN TOASTER
Filed April 10, 1948  4 Sheets-Sheet 2
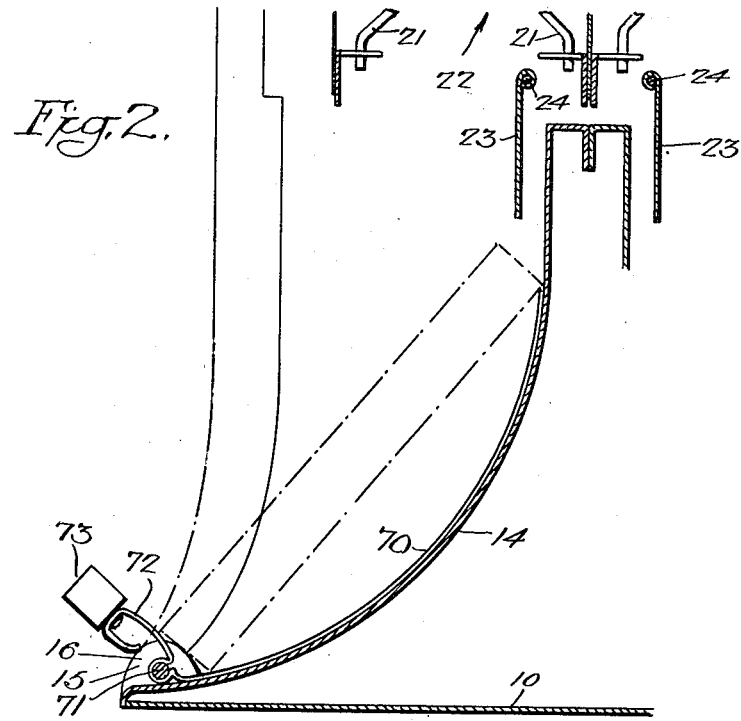
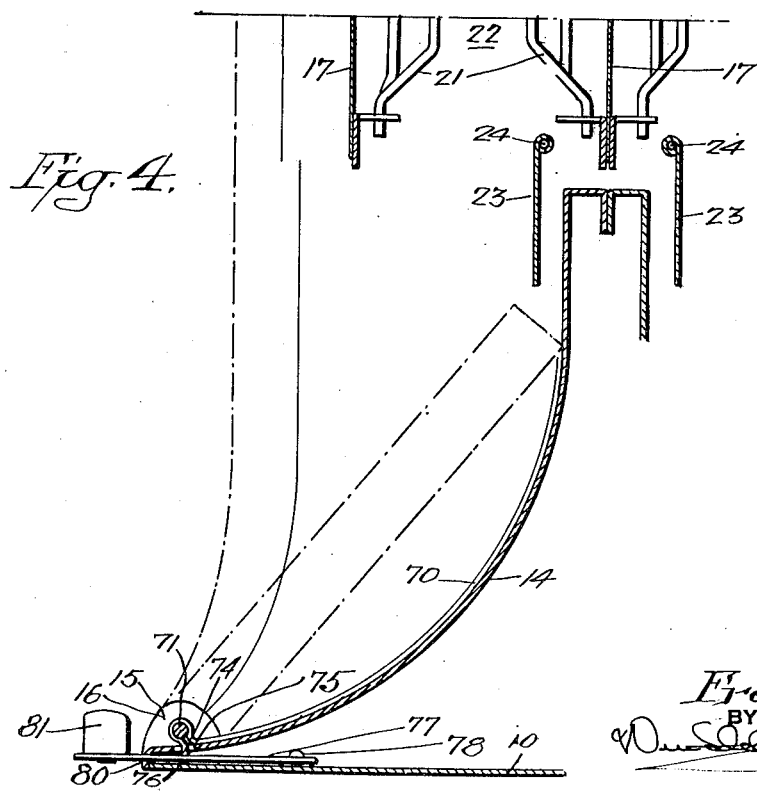
INVENTOR
Fred Bertino
BY
ATTORNEYS May 8, 1951 F. BERTINO 2,552,135
POP-DOWN TOASTER
Filed April 10, 1948 4 Sheets-Sheet 3

INVENTOR
Fred Bertino
BY
ATTORNEYS

May 8, 1951 F. BERTINO 2,552,135
POP-DOWN TOASTER
Filed April 10, 1948 4 Sheets-Sheet 4

INVENTOR
Fred Bertino
BY
ATTORNEYS

Patented May 8, 1951

2,552,135

UNITED STATES PATENT OFFICE 2,552,135

POP-DOWN TOASTER

Fred Bertino, Flushing, N. Y.

Application April 10, 1948, Serial No. 20,260

3 Claims. (Cl. 99—389)

The present invention relates to pop-down toasters for bread and the like.

A purpose of the invention is to assure holding of toast in the chute of a pop-down toaster to keep the toast warm.

A further purpose is to interrupt the passage of the toast from the chute by an abutment in the bottom of the chute, while at the same time making the toast readily removable.

A further purpose is to provide spaced abutments in the bottom of the chute, with an intermediate passage for removal of crumbs.

A further purpose is to employ a lifting finger normally conforming to the contour of the chute and capable of being raised readily to facilitate removal of the toast.

A further purpose is to employ a pivoted lever as a lifting finger.

A further purpose is to extend a cooperating element of the lifting mechanism into the path of the toast when the lifting mechanism is in inactive position so as to provide supplemental holding of the toast in the chute.

Further purposes appear in the specification and in the claims.

In the drawings I have chosen to illustrate several different embodiments of my invention, choosing the forms shown from the standpoints of convenience in illustration, satisfactory operation and clear demonstration of the principles involved.

Figure 1 is a partially diagrammatic perspective of a toaster embodying the present invention and having the cover and end plates removed.

Figures 2 to 5 inclusive are fragmentary transverse sections of the same showing the lower portion of the toasting compartment, the chute, the abutment and the lifting finger.

Figure 6:
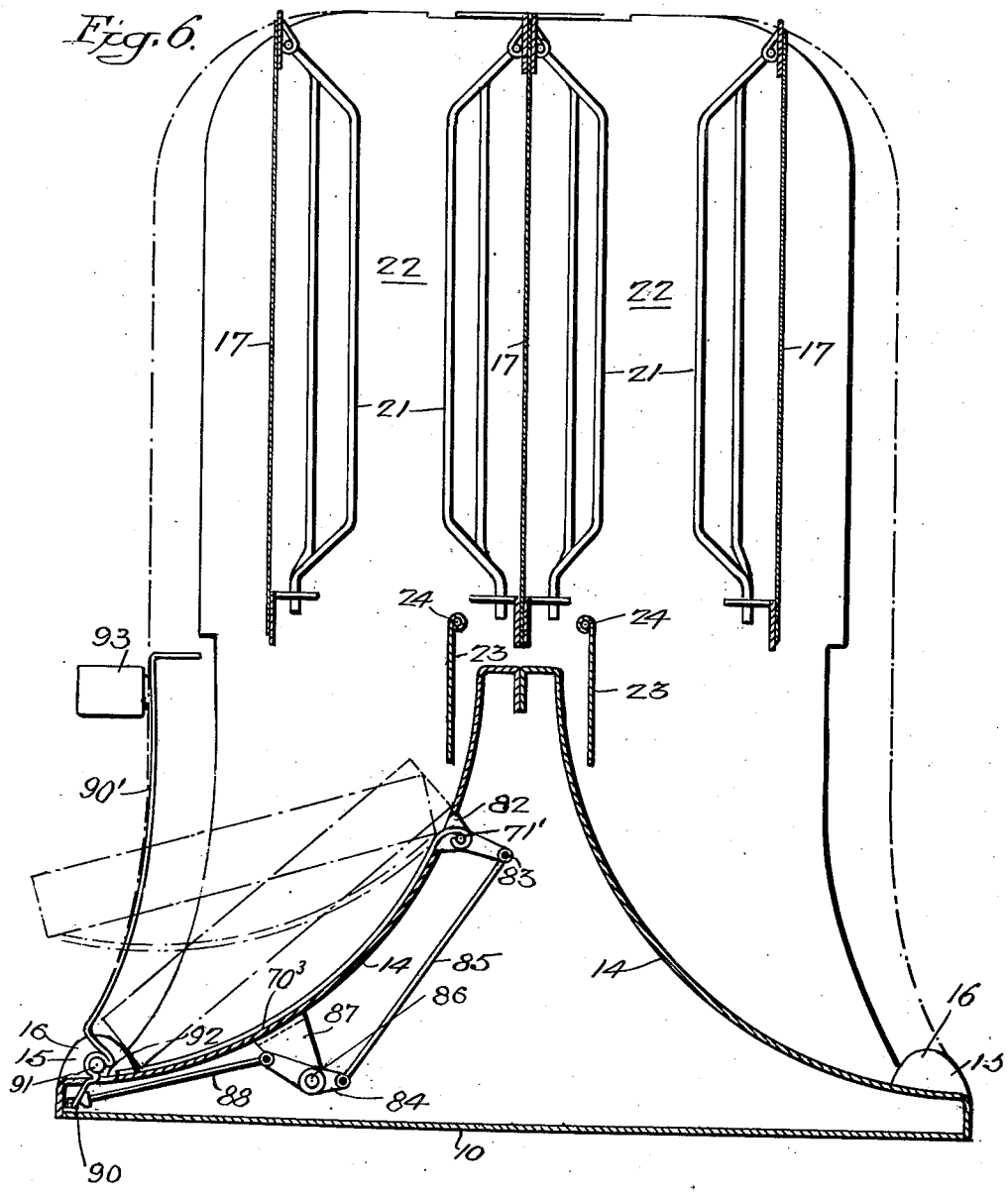

Figure 6 is a diagrammatic transverse section showing the chutes at both sides, and illustrating at one side only a special form of lifting mechanism, the chute at the other side being provided merely with abutments.

Describing in illustration but not in limitation and referring to the drawings:

The present application contains subject matter related to my copending application Serial No. 786,087, filed November 14, 1947, for Electric Toaster.

In the prior art where warming compartments have been used below toasting compartments, considerable difficulty has been encountered in removing the toast, and in some cases the temperature of the warming compartments has risen so high that it has been necessary to insert a fork or the like to take out a piece of toast.

In accordance with the present invention, a chute is provided below the toasting compartment of a pop-down toaster, and the chute is designed so that toast sliding down the chute will be held until lifted out, and thus will receive the benefit of excess heat from the toasting compartment to keep the toast warm. At the same time the outer edge of the toast is inclined and disposed so that it can be readily grasped without danger of burning the fingers. In certain embodiments auxiliary lifting fingers are provided to aid in removing the toast.

The product toasted is herein referred to as toast even though in many cases cake, crullers, sweet dough products and the like will be toasted rather than bread.

While the detail of the pop-down toaster is not in itself important to the present invention, it will be described to aid in understanding the operation of a typical device.

On the base 10 two parallel end plates 11 and 12 are supported. The end plates are deformed at 13 in a curved path to receive, engage and support the curved ends of discharge chutes 14, one on either side of the toaster. As best seen in Figure 1, and on the right hand side in Figure 6, the chutes at the bottom have upwardly extending abutments 15 which interfere with downward movement of a piece of toast and stop the lower edge of the toast against the abutments as shown in Figures 2 to 6. In a desirable embodiment as shown in Figure 1 and the right side of Figure 6, the abutments 15 are spaced to provide an intermediate passage 16 which permits the fingers to grasp the toast without reaching over the abutments and which can be used when the toast is not in position in the chute to remove crumbs and the like in wiping out the chute.

Heating elements 17 are supported on the upright plates 11 and 12 on either side of each toasting compartment. These may be conventional wired mica elements. There are three such heating elements in the form illustrated, one extending through the middle between two toasting compartments and the others extending parallel thereto on the outside of each toasting compartment. The several heating elements are connected by bus bars 18 extending through openings in the end plates and having suitable arms 20 for connection to the elements.

Spaced from the faces of the heating elements are vertical guide rods 21 which hold the slices of bread or other product to be toasted between the guide rods in spaced relation from each heating element.

Located at the bottom of each toasting compartment 22 is a toast holding and releasing support 23 pivoted on a rock shaft 24 which extends beyond and is pivoted in the uprights 11 and 12. In this type of pop-down toaster the supports 23 swing down to release the toast into the chutes.

The various working elements connected with the release of the supports are mounted on the outer surface of upright 12 as seen in Figure 1.

The parts are here shown in the position which they occupy when the supports have swung down.

Two vertical guide rods 25 are supported at their ends in brackets 26 secured to the upright 12. Two separate cooperating slides 27 and 28 are slidably mounted on the guide rods 25. Slide 27 is provided with inturned flanges 30 at the top and bottom, while companion slide 28 has out-turned flanges 31 at the top and bottom. As the slide 27 slides downwardly its flanges will contact the flanges of slide 28 and move the slide 28 down also. Slide 28 has a lug 32 at one side which contacts a stop 33 on upright 12 to limit the downward sliding movement of the slides 27 and 28. Upward movement of slide 28 is limited by stop 33' engaging the top flange 31. Upward movement of slide 27 is limited by the engagement of the top flange 30 of slide 27 against the brackets 26.

Slide 27 carries a plunger 34 which in the depressed position engages a pivoted lever arm 35 and forces it down to cock a clock mechanism 36 and to close an electric switch 37 to cause current to flow through the heating elements. The clock mechanism is conventional and will not be described further. The slide 27 as soon as it is pressed down and released is returned to its upper position by the action of spring 38 having one end secured to a fixed lug 40 on the upright 12 and the other end secured to the bottom inturned flange 30 of slide 27.

Slide 28 has a central downwardly extending arm 41 formed with a detent recess 42 adjacent its lower end. Pivotally connected to the arm 41 by a pivot pin 43 are two diverging levers 44, one at the front and the other at the back of arm 41. Each lever 44 has a slot 45 at the end through which the pivot pin 43 passes and has a squared opening at its opposite end to receive the squared projecting end of the rock shaft 24 of the toast support.

As the slide 28 moves downward, the two arms 44 are pushed downward by their pivot pin 43 and turn the rock shafts 24 of the toast supports to raise the toast supports to the horizontal or supporting position. A latch 46 is pivoted at 47 on the upright 12 and has a latching end 48 in the path of the downwardly moving arm 41 so that as the slide 28 moves downward to a position slightly beyond the point where the supports 23 are raised to horizontal position, the latching end 48 of the latch engages the detent recess 42 of the arm 41 and holds the arm in lower position until the latch is subsequently released.

Thus as long as the arm 41 is held in lower position, the toast supports 23 are held in their toast supporting or horizontal positions.

The arm 41 has a cam end 50 beyond the detent to aid in engaging the latch in the detent recess. The lower end 51 of the latch is bent outwardly and positioned above the lever 35 of the clock mechanism, so that after the clock has run its set time, the lever travels up against the lower end of the latch and trips the latch. The latch is continuously urged into its latching position by a spring 52 extending to an abutment 53 on the upright 12.

The return of the slide 28 is accomplished by springs 54 around the lower portions of the guide rods 25 and bearing against the bottom flange 31 of slide 28.

Any suitable auxiliary latch release may be provided, to permit releasing the bread before automatic release occurs. In the present instance the auxiliary latch release comprises a release 55 pivoted on the slide 27 at 56 and interconnected with the end 51 of the latch by a pull rod 57. An operating handle 58 is provided which may receive any suitable knob and may be used to press down the slides and start the operating cycle of the toaster, and also to operate the auxiliary release. The auxiliary latch release is limited in movement by lugs 59 and 60 on the slide 27.

Electrical lead-in is provided through suitable wiring 61, one line of which passes through the switch 37.

Correction for the lack of preheat in the testing compartments when the first piece of bread is toasted may be provided by a suitable thermostatic bimetal strip 62 adjoining the toasting compartments and mounted on the inside of upright 12 by a bracket 63. The lower end of the thermostatic strip contacts the upper end 64 of a lever 65 pivoted at 66 on the timer and having an operating end 67 which engages the gear train on the timer and immobilizes it for a period until the thermostat expands to a predetermined degree, after which the timer is free to operate.

An adjustment for the time cycle of the timer may be provided in any suitable way, as by a linkage 68.

In the preferred form of chute abutment as shown in Figure 1 and the right hand side of Figure 6, the action of the abutment is static to stop and hold the bread in warming position in the chute until the user desires to lift the bread from the chute. In some cases, however, it is preferable to facilitate such removal and various mechanisms are shown for accomplishing this purpose. In Figures 2 to 5 and the left hand side of Figure 6, a lifting finger is located preferably at a position such as the center of the chute between the abutments. The finger in all of these forms has a normal or inactive position conforming to the curvature of the chute and an active position raised from the chute by one of the mechanisms shown.

As illustrated in Figure 2, the lifting finger 70 is curved to follow the curvature of the bottom of the chute, and is pivoted at 71 near the bottom of the chute. An operating arm 72 extends out from the finger generally transversely to the lifting finger and carries an operating handle 73. The operating arm 72 thus extends across the path of the descending toast, and serves to stop and retain the toast even if the abutment is not employed or even if the toast should tend to jump the abutment.

Figure 3:
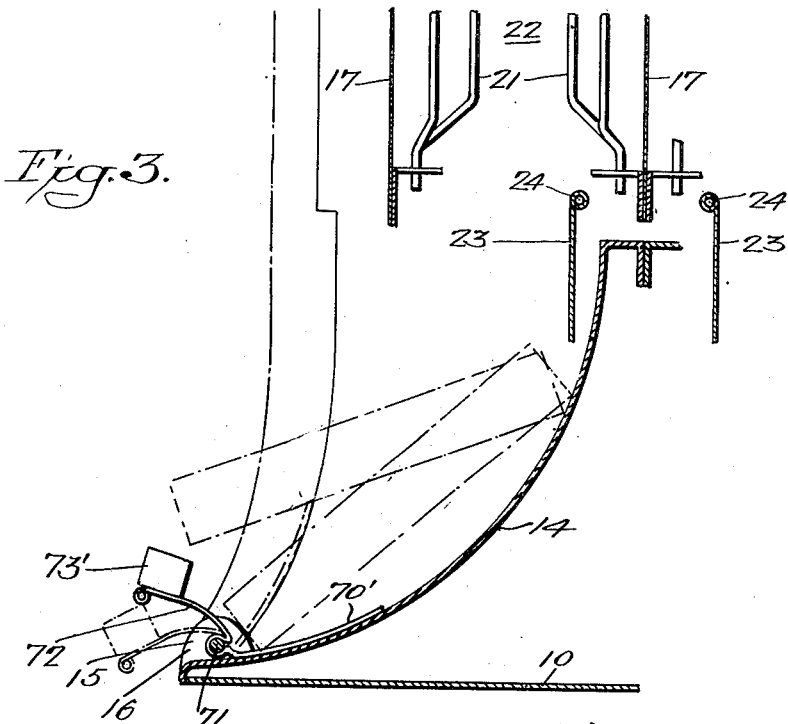

In the form of Figure 3 the lifting finger 70' is shorter than in the form of Figure 2 and the handle or knob 73' is placed on the top of the operating arm 72, but in general the lifting finger functions in the same way to raise the piece of toast in the chute into a position in which it can readily be grasped (as suggested by the drawing).

In Figure 4 the operation is slightly varied by extending an operating projection 74 on the lifting finger 70 downward below the pivot through an opening 75 in the chute and engaging it in a cam slot 76 of a swinging lever 77 pivoted at 78 and extending out through an opening 80 in the front of the chute. An operating handle 81 is provided so that in this form it is necessary merely to rock the operating handle in the direction in which the cam slot moves the lifting finger away from the chute.

Figure 5:
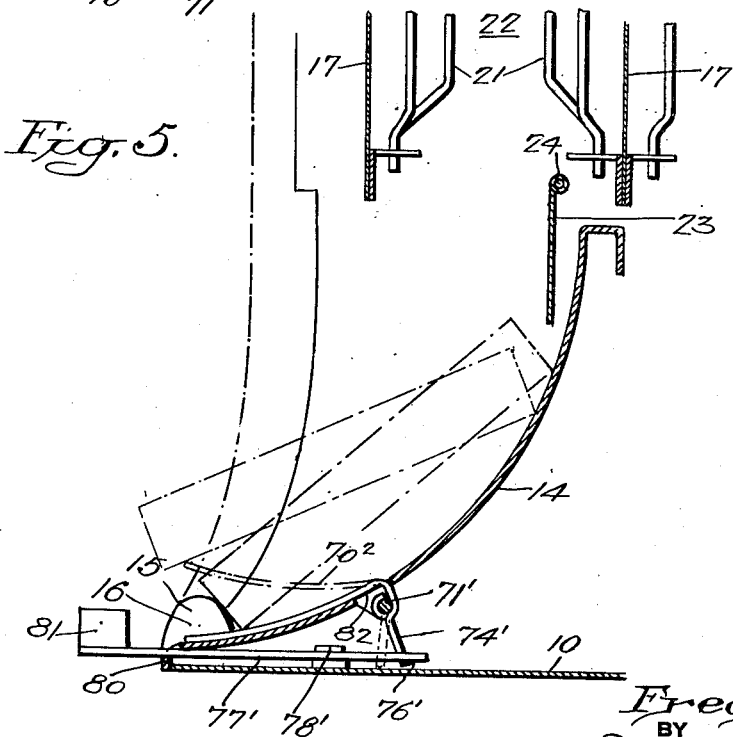

In the form of Figure 5 a lifting finger $70^2$ is provided which conforms to the curvature of the lower part of the chute but is pivoted at a point above the bottom of the chute, being transversely bent to extend through an opening 82 in the chute for pivotally mounting at 71', and having an elongated arm 74 beyond the pivot which engages in a cam slot 76' of an operating lever 77' pivoted intermediate its ends at 78' and otherwise similar to Figure 4.

In the form shown at the left in Figure 6 the pivot support of the lifting finger $70^3$ is moved even higher in the chute than in Figure 5. Operation is provided by an arm 83 secured to the lifting finger and extending beyond the pivot 71', connected to a bell crank 84 by a pivotal link 85 at one end. The bell crank is pivoted at 86 on a bracket 87 mounted on the chute. The opposite end of the bell crank connects with a pivotal link 88 to an operating lever 90 pivoted at 91 intermediate its ends and extending through an opening 92 near the base of the chute.

The lever 90 may to advantage be extended and widened at 90' to cover the entire mouth of the chute when in inactive position, thus forming a door, opened by a handle 93.

In operation of the toaster, the handle 58 is pressed down to its full extent so as to move the toast supports into position to receive the product to be toasted, and so as to close the electric circuit. After the handle has thus been pressed down it will immediately return to its initial position, thus removing any load from the clock mechanism. After the toasting cycle has been completed, the toast supports will swing down and discharge the product into the chutes, where it will be held by the abutments. The toast will be kept warm for a period of time, and can be removed either by grasping the lower end beyond the abutments or in the space between the abutments, or by raising the toast by the lifting finger to a position for grasping.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a pop-down toaster, a toaster housing having upright sides and having discharge chute openings near the bottom within the vertical projection of the confines of the side walls, upright toasting elements in the housing spaced to provide a pair of toasting compartments, a toast holding and releasing support at the bottom of each of the toasting compartments, chutes within the confines of the housing and communicating with the respective chute openings, located below the toasting compartments, and each extending transversely to the length of the toasting compartment from a position immediately below the toasting compartment, each of the chutes receiving heat from the housing and from the corresponding toasting compartment, a toast engaging abutment extending across the bottom of each chute in the direction of the length of the toasting compartment, a lifting finger in each chute having an inactive position conforming to the shape of the back of the chute and operating mechanism for each lifting finger for raising the lifting finger and thereby facilitating the removal of toast lying in the chute without burning the fingers of the user, whereby toast can be kept warm in the chutes while other toast is being made in the toasting compartments, and the toast in the chutes can be removed at will without interfering with the toast being made.

2. In a pop-down toaster, a toaster housing having upright sides and having discharge chute openings near the bottom within the vertical projection of the confines of the side walls, upright toasting elements in the housing spaced to provide a pair of toasting compartments, a toast holding and releasing support at the bottom of each of the toasting compartments, chutes within the confines of the housing and communicating with the respective chute openings, located below the toasting compartments, and each extending transversely to the length of the toasting compartment from a position immediately below the toasting compartment, each of the chutes receiving heat from the housing and from the corresponding toasting compartment, a toast engaging abutment across the bottom of each chute, a lifting lever in each chute having pivotal support, having a normal position resting against the back of the chute and a raised position projecting up from the chute and means for swinging each lifting lever about its pivot at will to facilitate the removal of the toast without burning the fingers, whereby toast can be kept warm within the chutes and within the confines of the housing for as long as desired while other toast is being made in the toasting compartments.

3. In a pop-down toaster, a toaster housing having upright sides and having discharge chute openings near the bottom within the vertical projection of the confines of the side walls, upright toasting elements in the housing spaced to provide a pair of toasting compartments, a toast holding and releasing support at the bottom of each of the toasting compartments, chutes within the confines of the housing and communicating with the respective chute openings, located below the toasting compartments, and each extending transversely to the length of the toasting compartment from a position immediately below the toasting compartment, each of the chutes receiving heat from the housing and from the corresponding toasting compartment, a lifting finger lying in each chute normally in a position conforming to the outline of the back of each chute and operating mechanism including an operating lever extending out into each chute in the path of the toast when the lifting finger is conforming to the contour of the chute and operatively connected to the lifting finger to raise the same and thereby facilitate removal of the toast, whereby toast can be kept warm in each chute while other toast is being made in the toasting compartments.

FRED BERTINO.

REFERENCES CITED

The following references are of record in the file of this patent:

UNITED STATES PATENTS

| Number | Name | Date |
|---|---|---|
| 1,691,361 | Roberts | Nov. 3, 1928 |
| 1,809,112 | Criner | June 9, 1931 |
| 1,852,398 | Bersted | Apr. 5, 1932 |
| 1,888,992 | Lofgren et al. | Nov. 29, 1932 |
| 1,907,650 | McLelland et al. | May 9, 1933 |
| 2,115,267 | Jones | Apr. 26, 1938 |